(12) United States Patent
Minato

(10) Patent No.: US 9,020,209 B2
(45) Date of Patent: Apr. 28, 2015

(54) FACE IDENTIFICATION DEVICE

(75) Inventor: Yoshihisa Minato, Kyoto (JP)

(73) Assignee: Omron Corporation, Kyoto (JP)

( * ) Notice: Subject to any disclaimer, the term of this patent is extended or adjusted under 35 U.S.C. 154(b) by 1796 days.

(21) Appl. No.: 11/591,530

(22) Filed: Nov. 2, 2006

(65) Prior Publication Data

US 2007/0098231 A1    May 3, 2007

(30) Foreign Application Priority Data

Nov. 2, 2005   (JP) .................... 2005/320021

(51) Int. Cl.
*G06K 9/00*   (2006.01)
*G06K 9/03*   (2006.01)

(52) U.S. Cl.
CPC ........ *G06K 9/00281* (2013.01); *G06K 9/00744* (2013.01); *G06K 9/036* (2013.01)

(58) Field of Classification Search
None
See application file for complete search history.

(56) References Cited

U.S. PATENT DOCUMENTS

| | | | | |
|---|---|---|---|---|
| 6,600,830 B1 * | 7/2003 | Lin et al. | ...................... | 382/118 |
| 7,043,059 B2 * | 5/2006 | Cheatle et al. | ................ | 382/112 |
| 7,203,346 B2 * | 4/2007 | Kim et al. | ...................... | 382/118 |
| 7,593,551 B2 | 9/2009 | Kamei | | |
| 2003/0215115 A1 * | 11/2003 | Kim et al. | ...................... | 382/118 |
| 2004/0125991 A1 | 7/2004 | Yokoi | | |
| 2005/0207622 A1 * | 9/2005 | Haupt et al. | ................... | 382/118 |
| 2006/0257050 A1 * | 11/2006 | Obrador | ....................... | 382/286 |

FOREIGN PATENT DOCUMENTS

| | | |
|---|---|---|
| JP | 2003-187229 A | 7/2003 |
| JP | 2004-005622 A | 1/2004 |
| JP | 2004-192250 A | 7/2004 |
| JP | 2004-213087 A | 7/2004 |
| JP | 2005-227957 A | 8/2005 |

OTHER PUBLICATIONS

Examination Report dated Nov. 16, 2010 issued in the related Japanese Application No. JP 2005-320021.

* cited by examiner

*Primary Examiner* — Kim Vu
*Assistant Examiner* — Fred Hu
(74) *Attorney, Agent, or Firm* — Dickstein Shapiro LLP

(57) ABSTRACT

A method for identifying a person includes the steps of detecting the face of a person in an input image, determining the reliability of each feature value from the input image, and obtaining a plurality of feature values from the detected face. Based on the feature values obtained from the detected face, the feature values stored on a storage unit, and the reliability of each feature value, an identification result according to the detected face is decided. A device includes the components for implementing said method.

16 Claims, 9 Drawing Sheets

| $\theta$ | 101 | 102 | 103 |
|---|---|---|---|
| -60 | 0.1 | 0.7 | 0.4 |
| -30 | 0.3 | 0.8 | 0.7 |
| 0 | 1.0 | 1.0 | 1.0 |
| +30 | 0.8 | 0.3 | 0.7 |
| +60 | 0.7 | 0.1 | 0.4 |

Fig. 6

| Shade/Halation | Reliability |
|---|---|
| 0-24 | 1.0 |
| 25-49 | 0.66 |
| 50-74 | 0.33 |
| 75-100 | 0.05 |

8b

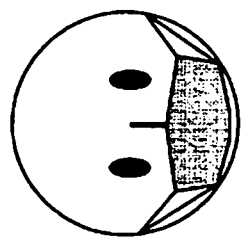
Fig. 7C
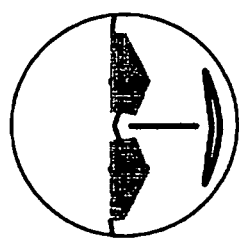
Fig. 7B
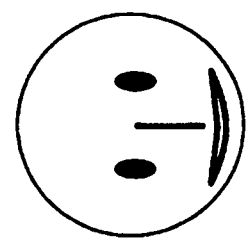
Fig. 7A
Fig. 8
| Worn article | 101 | 102 | 103 |
|---|---|---|---|
| Sunglasses | 0 | 0 | 1.0 |
| Mask | 1.0 | 1.0 | 0 |
8c

FACE IDENTIFICATION DEVICE

BACKGROUND OF THE RELATED ART

1. Field of the Invention

The present invention relates to a device and a method for identifying a human face.

2. Description of the Related Art

A conventional method for identifying a person (i.e. determining whose face is included) involves comparing registered information, such as feature values and performing a comparison between this information and a identification image. However, if conditions are not suitable for identification, that is, if a subject wears an article covering all or a part of the face such as sunglasses or a mask (hereinafter referred to as a "worn article"), or the lighting environment is too dark or too bright, or the subject faces sideways, the identification accuracy decreases.

In order to solve such a problem, it has been proposed that face identification devices corresponding to various face directions be prepared, that the face direction be detected in an identification image, and that a suitable face identification device be used (see to Pose Invariant Face Recognition, by F. J. Huang, Z. Zhou, H. Zhang, and T. Chen, Proceedings of the $4^{th}$ IEEE International Conference on Automatic Face and Gesture Recognition, Grenoble, France, 2000, pp. 245-250.) Further, Laid-Open Japanese Patent Application No. 2000-215308 proposes providing an illumination sensor that senses the light intensity at the time of photography and also proposes that algorithms for extracting feature values and algorithms for identification are selected based on the light intensity previously determined. As such, for a plurality of functions relating to extraction of feature values and identification provided as mentioned above, image registration, algorithm tuning, studying of various parameters etc., must be performed for each of the functions.

Further Japanese Patent Publication No. 2923894, Laid-Open Japanese Patent Application No. 2002-015311 and 2003-132339 all discuss methods for maintaining identification accuracy in which an image or feature value determined when there are no unfavorable conditions is used to restore an image in which there are unfavorable conditions. However, with these methods, additional processing time is necessary and the accuracy of the restoration procedure is not guaranteed.

SUMMARY

A first embodiment according to the invention is a face identification device, including a storage unit, a face detection unit, a feature value obtainment unit, a reliability determination unit and a identification unit. The storage unit stores a plurality of feature values previously obtained from a face image of a registrant. The storage unit may be configured to store feature values of one registrant or feature values of a plurality of registrants. The face detection unit detects the face of a person from the input image. The feature value obtainment unit obtains a plurality of feature values from the detected face.

The reliability determination unit determines reliability of each feature value from the input image. Reliability is a value indicating how reliable the result obtained from identification processing is, when identification processing is performed by using the feature value. That is, if the subject in the input image faces sideways or wears a worn article such as sunglasses for example, it is difficult to accurately obtain specific feature values from the image. In such a case, if all feature values are used with similar weighting in identification processing, deterioration in identification accuracy may be caused. Therefore, the reliability determination unit decides reliability for each feature value, and hands over the reliability to the identification unit, which performs identification to prevent the identification accuracy from deteriorating. Note that a specific processing example of the reliability determination unit will be described later.

The identification unit identifies the detected face with the face of the registrant stored on the storage unit, by comparing the feature values stored on the storage unit with the feature values obtained from the detected face while taking into account the reliability of each feature value. That is, the identification unit performs identification while performing weighting based on the reliability of each feature value.

In a face identification device configured as described above, identification is performed based on the reliability determined for each feature value. Therefore, even when a specific feature value cannot be obtained with high accuracy, it is possible to prevent the identification accuracy from deteriorating by reducing the weighting or disregarding the feature value when performing identification.

The face identification device according to a second embodiment of the present invention may be configured to further include a partial area deciding unit for deciding a plurality of partial areas in an area including the detected face. In such a case, the storage unit may store a plurality of feature values previously obtained for respective partial areas from the face image of the registrant. Further, in such a case, the feature value obtainment unit may obtain the feature value from each partial area of the input image. Additionally, the identification unit may calculate a score of each partial area for the registrant by comparing the feature value of the registrant stored on the storage unit with the feature value obtained by the feature value obtainment unit for each partial area, and based on the score and the reliability, may identify the detected face with the face of the registrant stored on the storage unit.

The face identification device according to a third embodiment of the present invention may be configured to further include a direction determination unit for determining the direction of the detected face. In such a case, the reliability determination unit may determine the reliability of each feature value corresponding to the direction of the detected face.

The face identification device according to a fourth embodiment of the present invention may be configured to further include a brightness determination unit for determining the brightness of a part in which each feature value is to be obtained or the surrounding thereof. In such a case, the reliability determination unit may determine the reliability of each feature value corresponding to the brightness.

The face identification device according to a fifth the present invention may be so configured as to further include a worn article determination unit for determining whether a worn article is included with the detected face. In such a case, the reliability determination unit may determine the reliability of each feature value corresponding to whether a worn article being worn and a part where the worn article is worn.

The face identification device according to a sixth embodiment of the present invention may be so configured as to further include a direction determination unit for determining the direction of the detected face. In such a case, the partial area deciding unit may decide a range of each partial area corresponding to the direction of the detected face.

Several embodiments of the present invention may be implemented as a program for causing processing performed by each unit described above to be executed with respect to an information processor, or a recording medium on which the program is written. Further, a seventh embodiment according to the present invention may be specified as a method in which processing performed by each unit described above is executed by an information processor.

BRIEF DESCRIPTION OF THE DRAWINGS

FIG. 6 shows an example of a reliability table corresponding to the effects of lighting environment;
FIGS. 7A to 7C show examples of effects of worn articles;
FIG. 8 shows an example of a reliability table corresponding to the effects of the worn articles.

DETAILED DESCRIPTION

Figure 1:
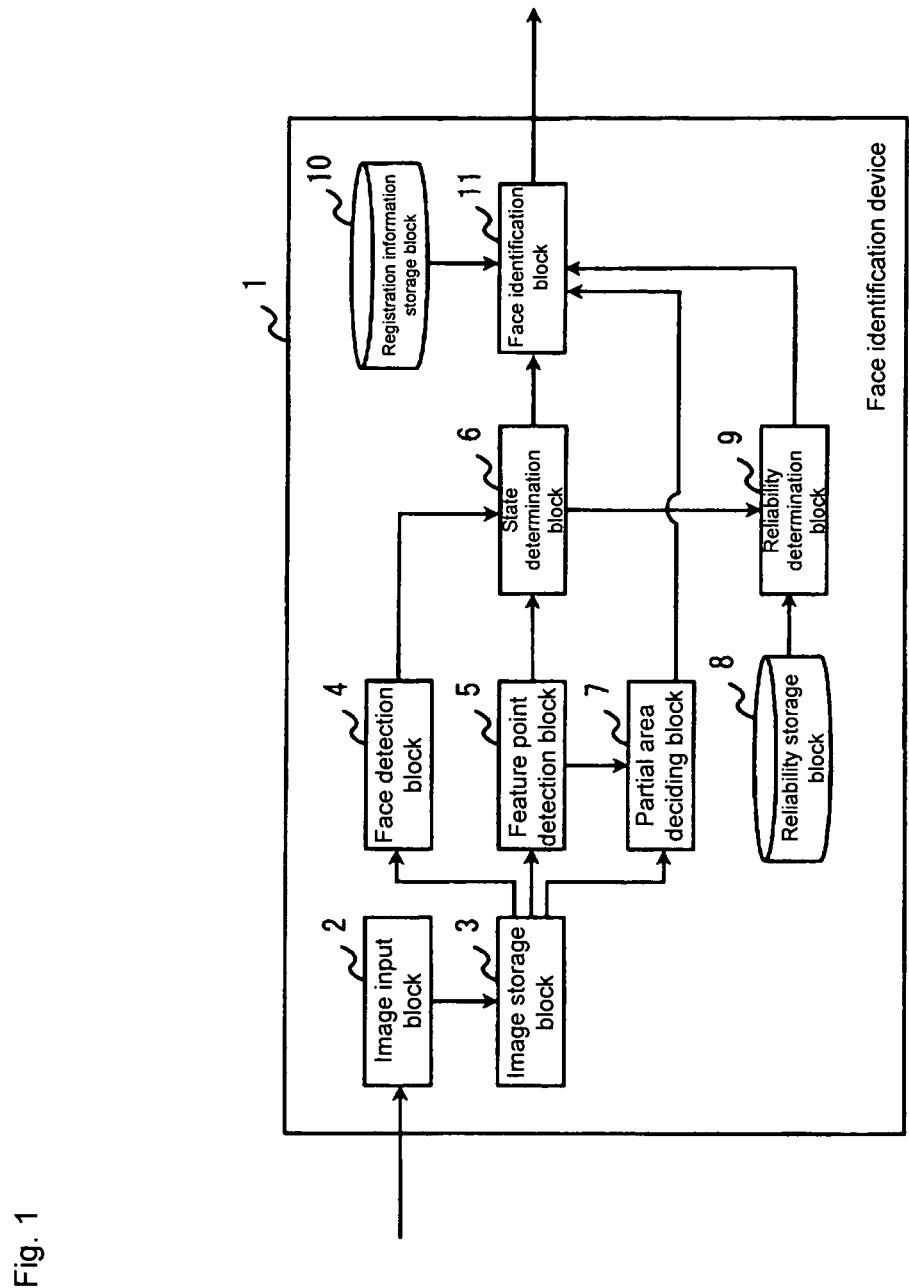
FIG. 1 shows a function block examples of a face identification device.

FIG. 1 shows function block examples of a face identification device 1. The face identification device 1 obtains feature values (e.g., brightness distribution and histogram) of a face from an image (identification image) in which a human who is the identification subject is captured, and compares them with the feature values of each person having been registered to determine who the person in the identification image is. The face identification device 1 includes, as hardware, a CPU (Central Processing Unit) connected via a bus, a main memory (RAM) and an auxiliary memory.

The face identification device 1 includes an image input block 2, an image storage block 3, a face detection block 4, a feature point detection block 5, a state determination block 6, a partial area deciding block 7, a reliability storage block 8, a reliability determination block 9, a registered information storage block 10 and a face identification block 11. Various programs (OS, applications, etc.) stored on the auxiliary memory are loaded to the main memory and executed by the CPU. The face detection block 4, the feature point detection block 5, the state determination block 6, the partial area deciding block 7, the reliability determination block 9 and the face identification block 11 are realized when the programs are executed by the CPU. Further, the face detection block 4, the feature point detection block 5, the state determination block 6, the partial area deciding block 7, the reliability determination block 9 and the face identification block 11 may be configured as a dedicated chip. Next, respective functional blocks included in the face identification device 1 will be described.

The image input block 2 works as an interface for inputting data of a identification image to the face identification device 1. By the image input block 2, data of a identification image is input to the face identification device 1. The image input block 2 may be configured by using any existing technique for inputting data of a identification image to the face identification device.

For example, data of a identification image may be input to the face identification device 1 over a network (e.g., local area network or the Internet). In such a case, the image input block 2 is configured by using a network interface. Further, data of a identification image may be input to the face identification device 1 from a digital camera, a scanner, a personal computer, a recording device (e.g., hard disk drive) or the like. In such a case, the image input unit 2 is configured corresponding to a standard (e.g., standard for a wire connection such as USB (Universal Serial Bus) or SCSI (Small Computer System Interface) or wireless connection such as Bluetooth (registered trademark)) for connecting the face identification device 1 with a digital camera, a scanner, a personal computer, a recording device or the like in a manner enabling data communications. Further, data of a identification image written on a recording medium (e.g., any kind of flash memory, flexible disk, CD (Compact Disk), DVD (Digital Versatile Disc, Digital Video Disc)) may be input to the face identification device 1. In this case, the image input unit 2 is configured by using a device for reading out data from the recording medium (e.g., flush memory reader, flexible disc drive, CD drive or DVD drive).

Further, the face identification device 1 may be incorporated in an image capturing apparatus such as a digital camera or any kind of apparatus (e.g., PDA (Personal Digital Assistant) or mobile telephone), and data of a captured identification image may be input to the face identification device 1. In this case, the image input block 2 may be configured using a CCD (Charge-Coupled Device), a CMOS (Complementary Metal-Oxide Semiconductor) sensor or the like, or configured as an interface for inputting data of a identification image captured by a CCD or a CMOS sensor to the face identification device 1. Moreover, the face identification device 1 may be incorporated in an image output device such as a printer or a display, and image data input into the image output device as output data is input into the face identification device 1 as an identification image. In this case, the image input block 2 is configured using a device for converting the image data input to the image output device into data which can be handled in the face identification device 1.

Further, the image input block 2 may be configured to be able to cope with the multiple cases mentioned above.

The image storage block 3 is configured using a memory. As a memory used as the image storage block 3, any specific technique may be applied such as a volatile memory or a nonvolatile memory.

The image storage block 3 stores data of a identification image input via the image input block 2. Data of an identification image stored on the image storage block 3 is read out by the face detection block 4, the feature point detection block 5, and the partial area deciding block 7. The image storage block 3 holds data of the identification image, which is the subject of the processing, until processing at least performed by the face detection block 4, the feature point detection block 5, the state determination block 6, the partial area deciding block 7 and the face identification block 11 has been completed.

The face detection block 4 reads data of a identification image from the image storage block 3, and detects the human face from the identification image, and specifies the position and the size of the detected face. The face detection block 4 may be configured so as to detect the face by template matching using a reference template corresponding to the contour of the whole face, or configured so as to detect the face by template matching based on organs (eyes, nose, ears, etc.) of the face. Alternatively, the face detection block 4 may be configured so as to detect the vertex of the head or the like by chroma-key processing to thereby detect the face based on the vertex. Alternatively, the face detection block 4 may be configured so as to detect an area of a color similar to the skin color to thereby detect the area as the face. Alternatively, the face detection block 4 may be configured so as to perform learning by teacher signals using a neural network to thereby detect a face-like area as the face. Further, face detection processing by the face detection block 4 may be realized by applying any other existing techniques.

Further, if faces of multiple people are detected from an identification image, the face detection block 4 may decide which face is to be the subject of processing according to predetermined criteria. Predetermined criteria include face size, face direction, and face position in an image.

The feature point detection block 5 detects a plurality of feature points for a face detected by the face detection block 4. Any of the existing feature point detection technique may be applied to the feature point detection block 5. For example, the feature point detection block 5 may be configured so as to previously learn patterns showing the positions of face feature points and perform matching using the learned data to thereby detect feature points. Alternatively, the feature point detection block 5 may be configured so as to detect edges and perform pattern matching inside the detected face to thereby detect end points of the organs of the face, and by using them as references, detect feature points. Alternatively, the feature point detection block 5 may be configured so as to previously define shapes or texture models such as AAM (Active Appearance Model) and ASM (Active Shape Model), and by deforming them corresponding to the detected face, detect feature points.

The state determination block 6 determines, relating to the face detected by the face detection block 4, whether any unfavorable condition for identification has been caused, and if caused, determines the level. For example, the state determination block 6 may determine the angle of the direction of the detected face. Such a determination can be performed in the following manner, for example. First, the state determination block 6 obtains corresponding relationships between face images or parts thereof and face directions and corresponding relationship between arrangements of feature points of the face and face directions, for example, by learning them previously, to thereby be able to know the angle of the direction of the corresponding face. Such a determination of angle may be performed by applying another technique.

Further, the state determination block 6 may determine the effect of a lighting environment. Such a determination can be performed in the following manner for example. First, the state determination block 6 obtains the brightness for each partial area decided by the partial area deciding block 7 described later. Then, the state determination block 6 determines for each partial area that to what degree it is dark or bright. Alternatively, the state determination block 6 may perform processing in the following manner. First, the state determination block 6 sets a point or an area corresponding to each partial area in the detected face, and obtains the brightness for each of them. The state determination block 6 may be configured to determine darkness or brightness for each partial area based on the obtained brightness. Further, determination of the effect of such a lighting environment may be performed by applying another technique.

Further, the state determination block 6 may determine whether there is any worn article. Such a determination can be performed in the following manner, for example. First, the state determination block 6 previously performs learning based on an image in which a worn article, such as sunglasses or a mask, is worn. Then, the state determination block 6 performs detection processing based on the learning in the face detected by the face detection block 4, and if any worn article is detected, determines that the worn article is worn.

Alternatively, the state determination block 6 may be configured so as to obtain templates and color information about worn articles and perform detection by obtaining the correlation thereto. Alternatively, based on an empirical rule that entropy and dispersion deteriorate if the subject wares a worn article such as sunglasses or a mask, the state determination block 6 may be configured so as to detect by using a substitute index such as entropy. Further, if a worn article is detected, the state determination block 6 may be configured so as to obtain a value (concealment ratio) to what degree the face is concealed by the worn article. The concealment ratio can be obtained by examining to what degree the feature points of an organ likely to be concealed can be detected near the part where the worn article is detected, for example.

Further, the state determination block 6 may be configured to obtain the information amount included in the image of each partial area, for each partial area decided by the partial area deciding block 7 described later. The information amount can be shown as entropy for example. Alternatively, the information amount may be shown as relative entropy or KL (Kullback Leibler) divergence of the same partial area in an ideal image having sufficient information amount.

The partial area deciding block 7 designates partial areas based on positions of the plural feature points detected by the feature point detection block 5. A partial area is an area which is a part of a face image. For example, the partial area deciding block 7 may be configured so as to designate a polygon such as a triangle having feature points at the respective vertexes as a partial area.

Figure 2:
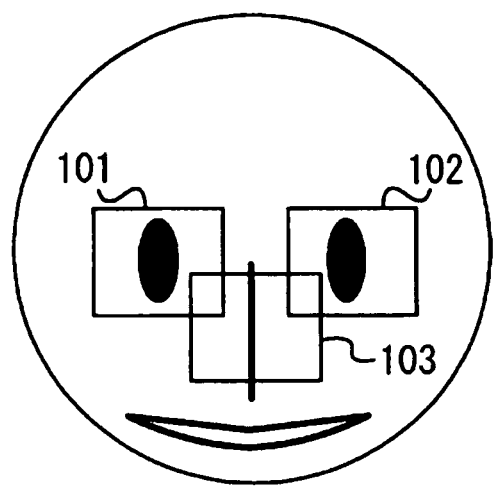
FIG. 2 shows a specific example of partial areas.
Figure 3:
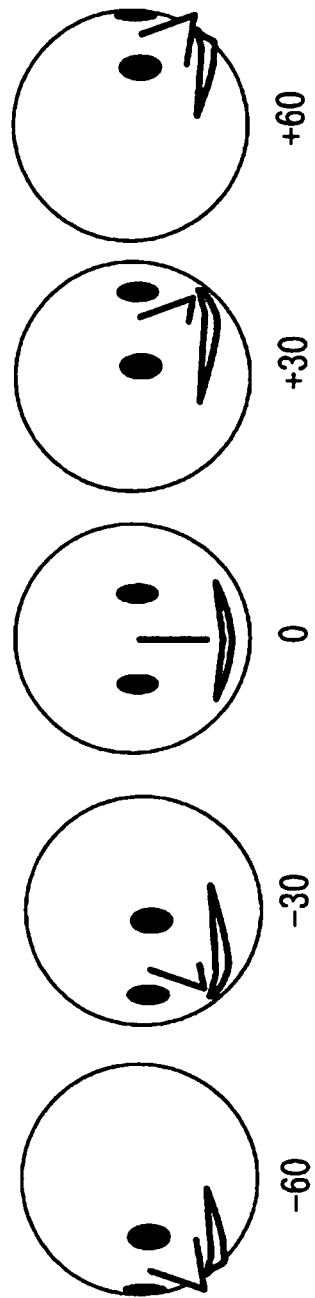
FIGS. 3A to 3E show examples of face directions.

FIG. 2 shows specific examples of partial areas. In FIG. 2, three partial areas 101, 102 and 103 indicated by rectangles are designated by the partial area deciding block 7. The partial area 101 is a part including the right eye and the surrounding thereof of the subject. The partial area 102 is a part including the left eye and the surrounding thereof of the subject. The partial area 103 is a part including the nose and the surrounding thereof of the subject. The partial area deciding block 7 may be configured to designate partial areas different from them, or to designate more partial areas.

The reliability storage block 8 is configured by using a storage device. The reliability storage block 8 stores a reliability table. The reliability table contains reliability values for respective partial areas in various conditions. Reliability is a value showing to what degree the result obtained from identification processing is reliable when identification processing is performed using the feature value of the partial area. In the following description, the reliability value is indicated as a value in a range of 0 to 1, in which the reliability is lower as the value becomes close to 0, and the reliability is higher as the value becomes close to 1. Note that values of the reliability may be continuous values or discrete values.

Figure 4:
FIG. 4 shows an example of a reliability table corresponding to the face directions of the subject.

First, reliability corresponding to a face direction of the subject will be described. FIGS. 3A to 3E show examples of face directions. As shown in FIGS. 3A to 3E, in the present embodiment, angle is expressed such that the right side for whom viewing the identification image indicates positive value and the left side indicates negative value. FIGS. 3A to 3E show examples of the face of the subject facing −60°, 30°, 0°, +30° and +60°, respectively. FIG. 4 shows a specific example of a reliability table 8a corresponding to the face directions of the subject. The reliability table 8a in FIG. 4 shows reliabilities in the respective partial areas 101 to 103 for the respective face directions (θ).

Explanation will be given exemplary for the case of −60°. Almost all part of the left eye of the subject appears in the image, but the half of the right eye is hidden. Therefore, compared with the reliability of the partial area 102 corresponding to the left eye, the reliability of the partial area 101 corresponding to the right eye is set substantially lower. Further, in the case of –30°, the right eye appears in the image to some extent, compared with the case of –60°. Therefore, for the reliability in the partial area 101, the case of –30° is set higher than the case of –60°. Further, the feature value used in identification (feature value stored on the registered information storage block 10 described later) is generally a feature value obtained from a full-face image. Therefore, if the face of the subject faces sideways in the identification image, the accuracy deteriorates due to distortions being caused or the like, irrespective of all feature points in the partial area appearing on the image or not. Accordingly, the reliability of each partial area 101 to 103 is set lower as the angular absolute value increases.

Figure 5C:
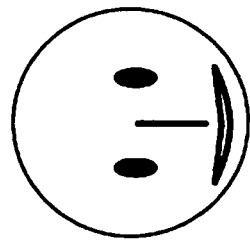
FIGS. 5A to 5C show examples of effects of lighting environment.
Figure 5B:
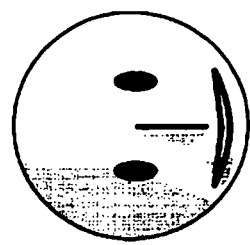
Figure 5A:
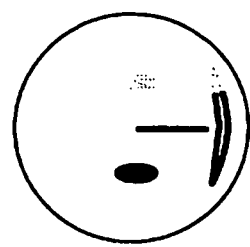

Next, explanation will be given for a reliability table corresponding to effects of lighting environments. FIGS. 5A to 5C show specific examples of effects of lighting environments. In FIG. 5A, the whole face of the subject is lighted uniformly. On the other hand, in FIG. 5B, the left side of the face of the subject is lighted but the right side is shadowed. Therefore, in FIG. 5B, the surrounding part of the right eye is shadowed, so it is difficult to obtain the accurate feature value in the partial area 101. Further, in FIG. 5C, the right side of the face of the subject is lighted properly but the left side is lighted excessively, causing halation. Therefore, in FIG. 5C, halation is caused in the part of the left eye, so it is difficult to obtain the accurate feature value in the partial area 102.

FIG. 6 shows a specific example of a reliability table 8b corresponding to the effects of lighting environments. In this example, relationship between lighting environment and reliability is defined for all partial areas in common. In any partial area, reliability is decided depending on how many percentages of the area being shadowed or caused halation (e.g., may be expressed by using concealment ratio).

Next, explanation will be given for a reliability table corresponding to effects of worn articles. FIGS. 7A to 7C show specific examples of the effects of worn articles. In FIG. 7A, the subject does not have a worn article on the face, so the features in all partial areas appear on the image. On the other hand, in FIG. 7B, the subject wares sunglasses, so the right and left eyes are concealed, making it difficult to obtain the accurate feature value in the partial areas 101 and 102. Further, in FIG. 7C, the subject wares a mask, so the nose, mouth, cheeks etc., are concealed, whereby it is difficult to obtain the accurate feature value in the partial area 103.

FIG. 8 shows a specific example of a reliability table 8c corresponding to the effects of worn articles. In this example, if sunglasses are worn, the reliability of the partial areas 101 and 102 is 0, and the reliability of the partial area 103, not affected by the sunglasses, is 1. On the other hand, if a mask is worn, the reliability of the partial area 103 is 0, and the reliability of the partial area 101 and 102, not affected by the mask, is 1. Values in the reliability table 8c are not necessarily limited to "0" and "1", but may be expressed by using other values (e.g., "0.1" and "0.9").

Next, explanation will be given for a reliability table corresponding to the information amount obtained for each partial area. In this case, the reliability table is configured so that the reliability becomes closer to 1 as the information amount increases, and the reliability becomes closer to 0 as the information amount decreases.

The reliability determination block 9 determines the reliability of each partial area decided by the partial area deciding block 7, based on the determination results by the state determination block 6 and the reliability tables stored on the reliability storage block 8. If it is determined by the state determination block 6 that a plurality of adverse effects exist, the reliability determination block 9 may be configured so as to calculate statistics (average, center of gravity, etc.) of the reliabilities corresponding to the respective conditions and decide them as the reliabilities. Further, priority may be set for the respective conditions, and the reliability determination block 9 may be configured so as to decide the reliability obtained for the condition of the highest propriety as the reliability of the partial area.

The registered information storage block 10 is configured using a storage device. The registered information storage block 10 stores a registered information table. The registered information table includes the feature value of each partial area for each ID of a person who is to be the subject of identification. In the registered information table, for the feature value corresponding to an ID "A" for example, the feature value of the partial area 101, the feature value of the partial area 102 and the feature value of the partial area 103 are associated.

The face identification block 11 performs identification processing based on the feature values obtained from the respective partial areas, the feature values stored on the registered information storage block 10, and the reliabilities decided by the reliability determination block 9. Hereinafter, processing by the face identification block 11 will be described specifically. In the following description, the number of partial areas is not limited to three but is assumed as N pieces.

First, the face identification block 11 calculates the final scores for all IDs stored on the registered information storage block 10. The final score is calculated by executing score calculation processing and final score calculation processing using the calculated scores.

In the score calculation processing, the face identification block 11 calculates scores of respective partial areas (j=1, 2, ..., N). A score is a value calculated based on the feature value obtained from each partial area, indicating the possibility that the subject having the partial area is a specific subject. For example, a large score is obtained if the possibility is high and a small score is obtained if the possibility is low.

The score of each partial area can be calculated according to Equation 1 for example. Equation 1 indicates the probability $P(\psi_j|x_j, \theta)$ that the person (face) is the subject person when a feature value $x_j$ in a partial area j is obtained under a condition θ. However, ξ is a hyper parameter, which is a probability variable indicating how much the feature value obtained under the condition θ deviates from a feature value which should be obtained originally under an ideal condition (deviance). ψ is a probability variable indicating the ID of a registrant. Although the deviance ξ is treated as a discrete variable in Equation 1, it may be a continuous variable. Further, although a common condition θ is used for all partial areas in Equation 1, a different condition $\theta_j$ may be used for each partial area of course.

$$P(\psi_j|x_j, \theta) = \sum_{\xi} P(\psi_j|x_j, \xi)P(\xi|\theta) \quad \text{(Equation 1)}$$

$P(\psi_j|x_j, \xi)$ indicates a value (score not taking into account the condition θ) which can be obtained by comparing the feature values obtained from partial areas of the image with the feature values stored on the registered information storage block 10. This value is, for example, the similarity between both feature values. The similarity can be obtained by applying a face identification technique conventionally used. For example, normalized correlation of brightness distribution and histogram intersection of color histogram can be obtained as similarity.

On the other hand, $P(\xi|\theta)$ indicates reliability decided by the reliability determination block 9. That is, it is a value indicating reliability (or accuracy) of the feature value $x_j$ obtained in a partial area j under the condition $\theta$ (or similarity calculated from the feature value $x_j$ thereof). The reliability takes a smaller value as the condition $\theta$ becomes worse.

In other words, $P(\psi_j|x_j, \theta)$ in Equation 1 can be a value (adjusted score) obtained by adjusting the similarity $P(\psi_j|x_j, \xi)$ between the feature value of the subject and the feature value of the registrant, based on the state of the subject (reliability) $P(\xi|\theta)$. In the final score calculation processing described later, the final score used for final evaluation is calculated from the adjusted scores of the respective partial areas. For the final score, a greater effect is given to a score having high reliability. Therefore, the reliability $P(\xi|\theta)$ can be considered to be "weighting" when the final score is calculated.

When the score calculation processing has been completed, the face identification block 11 then performs the final score calculation processing. In the final score calculation processing, the face identification block 11 calculates the final score on the basis of the scores obtained from the respective partial areas. Equation 2 is an equation for calculating the final score in the case where the respective partial areas are considered as independent. Equation 3 is an equation for calculating the final score based on Bagging model or Mixture of Experts model, from which the final score can be obtained as the average of the scores of a local area. The face identification block 11 calculates the final score by using Equation 2 or 3, for example. Equations 2 and 3 are specific examples of processing capable of being applied in calculating the final score. The final score may be obtained by another processing. For example, the face identification block 11 may be so configured as to obtain the maximum value of the scores obtained from the respective partial areas as the final score.

$$P(\psi|x, \theta) = \prod_j^N P(\psi_j|x_j, \theta) \quad \text{(Equation 2)}$$

$$S(\psi|x, \theta) = \frac{1}{N}\sum_j^N P(\psi_j|x_j, \theta) \quad \text{(Equation 3)}$$

When the final scores are calculated for all IDs, the face identification block 11 determines who the subject in the identification image is, that is, whether the person has an ID or not. For example, if the largest final score exceeds a prescribed threshold, the face identification block 11 determines that the subject is a person with an ID corresponding to the final score. On the other hand, if the largest final score does not exceed a prescribed threshold, the face identification block 11 determines that the subject in the identification image is not a person with an ID stored on the registered information storage block 10, that is, an unregistered person. Then, the face identification block 11 outputs the determination result as the result of face identification.

Figure 9:
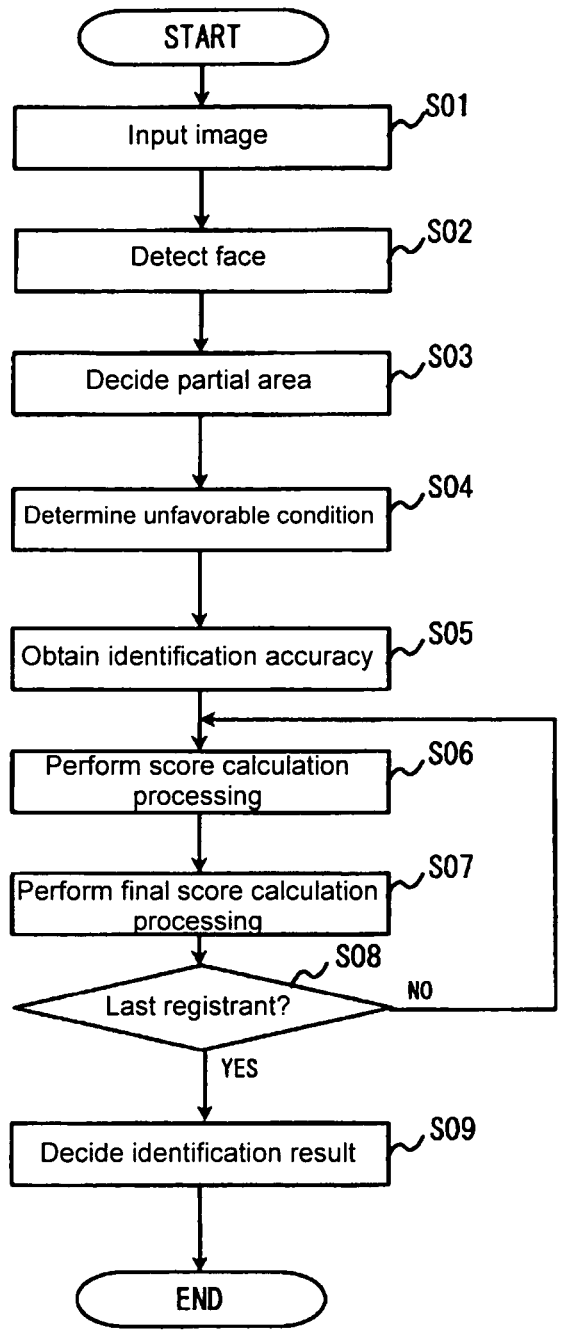
FIG. 9 shows a flowchart showing an exemplary operation of a face identification device.

FIG. 9 is a flowchart showing an operating example of the face identification device 1. Next, an operating example of the face identification device 1 will be explained. First, an identification image is input into the face identification device 1 via the image input block 2 (S01). The image storage block 3 stores data of the input identification image. The face detection block 4 detects the face of a person from the identification image stored on the image storage block 3 (S02). Next, the feature point detection block 5 detects a plurality of feature points from the detected face, and based on the feature points, the partial area deciding block 7 decides partial areas (S03).

Next, the state determination block 6 determines whether any unfavorable condition is caused in the detected face, and if caused, determines the degree thereof (S04). The reliability determination block 9 obtains the reliabilities of the respective partial areas based on the determination results by the state determination block 6 (S05).

Next, the face identification block 11 performs score calculation processing (S06) and final score calculation processing (S07) for each ID (each registrant) stored on the registered information storage block 10. This processing is repeated until processing for all registrants are completed (S08-NO). When the processing is performed for all registrants (S08-YES), the face identification block 11 decides the identification result based on the final score obtained for each registrant (S09). Then, the face identification block 11 outputs the identification result.

In the identification processing by the face identification block 11, degrees of effects of the feature values according to the respective partial areas are determined based on the reliabilities, which prevents deterioration in the accuracy of face identification processing in a identification image in which an unfavorable condition is caused.

Further, since it is configured so that the reliability determined from the image is multiplied with the similarity (score), functions such as face detection, feature value extraction, and similarity calculation can be performed commonly in all conditions. Therefore, it is possible to reduce the development cost, the program size, and used resources, which is extremely advantageous in implementation.

The face identification block 11 may be so configured as to perform score normalization processing after the final scores for all IDs are calculated. Score normalization processing can be performed in order to collect the values in a certain range if the range of the obtained final scores is too broad.

Figure 10:
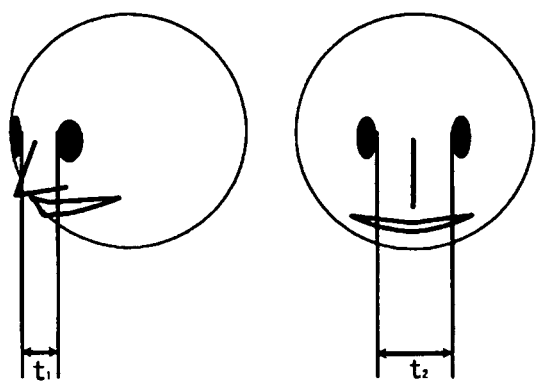
FIG. 10 shows an example of distortion corresponding to a face direction.

Further, if the face of the subject in the input identification image does not face the front, partial areas decided by the partial area deciding block 7 may be distorted depending on the direction. Further, the feature value used in identification by the face identification block 11 is generally a feature value obtained from a face image facing the front. Therefore, a distortion caused by the direction may cause an error in identification processing by the face identification block 11. FIG. 10 shows a specific example of a distortion corresponding to a face direction. Conventionally, there is a case where the distance between the both eyes is used in deciding partial areas. However, since the distance between the eyes depends largely on the face direction, in such a method of deciding partial areas, accuracy in identification deteriorates significantly according to the face direction of the subject. In the case of FIG. 10, it is also found that the distance between the eyes (t1) when facing sideways and the distance between the eyes (t2) when facing the front are significantly different. When the face direction is detected by the state determination block 7, the partial area deciding block 7 may change the size or the range of each partial area corresponding to the direction, that is, perform normalization corresponding to the direction. More specifically, when the face direction is determined by the state determination block 6, the partial area deciding block 7 may perform processing such as affine conversion to the partial area corresponding to the direction. Further, the partial area deciding block 7 may be configured to prepare templates corresponding to a plurality of face directions, and to designate the partial area by using a template corresponding to the determined direction. With such a configuration, it is possible to obtain a feature value under a condition closer to the feature value stored on the registered information storage block 10 to thereby prevent the accuracy of face identification from deteriorating due to face directions.

Further, the face identification device 1 may be configured so as to enable processing to register feature values in the registered information storage block 10 by inputting an image capturing the face of registrant (hereinafter referred to as registered images) into the face identification device 1, rather than inputting feature values into the face identification device 1. In such a case, the registered image input via the image input block 2 is stored on the image storage block 3. Then, through cooperation between the face detection block 4, the feature point detection block 5, the partial area deciding block 7 and the face identification block 11, feature values of the respective areas are obtained from the registered image, and are stored on the registered information storage block 10. In this case, the face identification device 1 may be configured such that the state determination block 6 determines the presence or absence of an unfavorable condition and its level in the registered image, and if it is in a certain level, registration will not be performed. With this configuration, it is possible to prevent feature values obtained under unfavorable conditions from being stored on the registered information storage block 10. Further, since face identification based on the feature values of low accuracy will not be performed, it is possible to prevent deterioration in the accuracy of the face identification processing thereafter.

In the embodiment described above, identification processing of "one to many", that is, to which ID's registrant face and the face of the subject coincides, is performed. However, the face identification device can be applied to identification processing of "one to one" in which it is determined whether the face photographed is the subject's face.

What is claimed is:

1. A face identification device comprising:
    a storage unit for storing a plurality of feature values previously obtained for respective partial areas from a face image of a registrant;
    a processor comprising:
        a face detection unit for detecting a face of a person from an input image;
        a partial area designating unit for designating a plurality of partial areas of an area including the face, the partial areas corresponding to feature points of a detected face including at least one of an eye and a nose;
        a state determination unit for determining from the detected face whether an unfavorable condition for identification of the detected face has occurred and, if so, determining the degree of the unfavorable condition, wherein unfavorable conditions include at least one of the angle of the direction of the detected face, the effect of a lighting environment of the detected face, a worn article on the detected face, and the entropy of each partial area of the detected face;
        a feature value obtainment unit for obtaining a plurality of feature values from the detected face for respective designated partial areas;
        a reliability determination unit for determining reliability for each feature value of the respective designated partial areas based on the results obtained by the state determination unit including the degree of unfavorable conditions, and predetermined reliability tables stored on a reliability storage unit, the reliability storage tables containing reliability values for respective designated partial areas under various degrees of unfavorable conditions; and
    an identification unit for identifying the detected face with the face of the registrant stored on the storage unit by comparing the plurality of feature values stored on the storage unit for the respective partial areas of the face image of the registrant with the plurality of feature values obtained from the designated partial areas, while taking into account the reliability of each feature value of the designated partial areas;
    wherein the identification unit calculates a score of each partial area for the registrant by comparing the feature values of the plurality of partial areas of the registrant stored on the storage unit with the feature values obtained by the feature value obtainment unit for the designated partial areas and based on the score and the reliability of each of the partial areas, identifies the detected face with the face of the registrant stored on the storage unit.

2. The face identification device according to claim 1, wherein the state determination unit comprises a direction determination unit for determining a direction of the detected face, wherein the reliability determination unit determines the reliability of each feature value of the plurality of designated partial areas corresponding to the direction of the detected face.

3. The face identification device according to claim 1, wherein the state determination unit comprises a brightness determination unit for determining brightness of a part where each feature value of the plurality of designated partial areas is to be obtained or a surrounding thereof, wherein the reliability determination unit determines the reliability of each feature value of the plurality of designated partial areas corresponding to the brightness.

4. The face identification device according to claim 1, wherein the state determination unit comprises a worn article determination unit for determining whether an article is worn by a subject in the detected face, wherein the reliability determination unit determines the reliability of each feature value of the plurality of designated areas corresponding to whether an article being worn and a part where the article is worn.

5. The face identification device according to claim 1, wherein the state determination unit comprises a direction determination unit for determining a direction of the detected face, wherein the partial area deciding unit designates a range of each partial area corresponding to the direction of the detected face.

6. A face identification method comprising the steps of:
    detecting a face, in an input image, using an information processor having a storage unit for storing a plurality of feature values previously obtained for respective partial areas from a face image of a registrant;
    designating a plurality of partial areas in an area including the detected face using the information processor;
    determining from the detected face whether an unfavorable condition for identification of the detected face has occurred and, if so, the degree of the unfavorable condition using the information processor, wherein unfavorable conditions include at least one of the angle of the direction of the detected face, the effect of a lighting environment of the detected face, a worn article on the detected face, and the entropy of each partial area of the detected face image;

obtaining a feature value from each partial area of the detected face using the information processor;

determining a separate reliability for each feature value of each designated partial area, using information on the detection of an unfavorable condition and its degree, using the information processor;

calculating a score of each partial area by comparing the feature value of the registrant stored on the storage unit with the feature value obtained by the feature value obtainment unit for each partial area using the information processor; and based on the score and the reliability of each feature value of each designated partial area, identifying the detected face with the face of the registrant stored on the storage unit using the information processor by comparing the plurality of feature values stored on the storage unit with the plurality of feature values obtained from the detected face, while taking into account the reliability of each feature value.

7. A program stored on a non-transitory computer readable medium, that, when executed by an information processor having a storage unit for storing a plurality of feature values previously obtained for respective partial areas from a face image of a registrant, causes the information processor to execute the steps of:

detecting a face of a person in an input image;

designating a plurality of partial areas in an area including the detected face;

determining from the detected face whether an unfavorable condition for identification of the detected face has occurred and, if so, the degree of the unfavorable condition, wherein unfavorable conditions include at least one of the angle of the direction of the detected face, the effect of a lighting environment of the detected face, a worn article on the detected face, and the entropy of each partial area of the detected face image;

obtaining a feature value from each partial area of the detected face;

determining a separate reliability for each feature value from each designated partial area using information on the detection of an unfavorable condition and its degree;

calculating a score of each partial area by comparing the feature value of the registrant stored on the storage unit with the feature value obtained for each partial area; and based on the score and reliability, identifying the detected face with the face of the registrant stored on the storage unit by comparing the plurality of feature values stored on the storage unit with the plurality of feature values obtained from the detected face while taking into account the reliability of each feature value.

8. The device of claim 1, wherein at least one unfavorable condition is a worn article on the detected face and determining the degree of the unfavorable condition comprises using an entropy index.

9. The device of claim 1, wherein at least one unfavorable condition is a worn article on the detected face and determining the degree of the unfavorable condition comprises obtaining a concealment ratio value.

10. The device of claim 9, wherein obtaining a concealment ratio value comprises determining to what degree the feature values of an area likely to be concealed can be detected near the part where the worn article is detected.

11. The method of claim 6, wherein at least one unfavorable condition is a worn article on the detected face and determining the degree of the unfavorable condition comprises using an entropy index.

12. The method of claim 6, wherein at least one unfavorable condition is a worn article on the detected face and determining the degree of the unfavorable condition comprises obtaining a concealment ratio value.

13. The method of claim 12, wherein obtaining a concealment ratio value comprises determining to what degree the feature values of an area likely to be concealed can be detected near the part where the worn article is detected.

14. The program of claim 7, wherein at least one unfavorable condition is a worn article on the detected face and determining the degree of the unfavorable condition comprises using an entropy index.

15. The program of claim 7, wherein at least one unfavorable condition is a worn article on the detected face and determining the degree of the unfavorable condition comprises obtaining a concealment ratio value.

16. The program of claim 15, wherein obtaining a concealment ratio value comprises determining to what degree the feature values of an area likely to be concealed can be detected near the part where the worn article is detected.

* * * * *